United States Patent [19]

Kito et al.

[11] Patent Number: 4,653,900
[45] Date of Patent: Mar. 31, 1987

[54] VERIFICATION APPARATUS

[75] Inventors: Eiichi Kito; Fumio Matsumoto, both of Tokyo, Japan

[73] Assignee: Fuji Photo Film Co., Ltd., Kanagawa, Japan

[21] Appl. No.: 860,386

[22] Filed: May 6, 1986

[30] Foreign Application Priority Data

May 7, 1985 [JP] Japan .................................. 60-96394
May 7, 1985 [JP] Japan .................................. 60-96395

[51] Int. Cl.⁴ ........................ G03B 29/00; G03B 27/52
[52] U.S. Cl. ........................................ 355/29; 355/27; 355/41
[58] Field of Search ........................ 355/40, 41, 27, 29

[56] References Cited

U.S. PATENT DOCUMENTS 3,411,007 11/1968 Thompson ............................. 355/40
3,690,765 9/1972 Rickard et al. ........................ 355/40
3,836,754 9/1974 Toye et al. ............................. 355/40
4,293,215 10/1981 Rosborough et al. ................. 355/40

Primary Examiner—Monroe H. Hayes
Attorney, Agent, or Firm—Sughrue, Mion, Zinn, Macpeak and Seas

[57] ABSTRACT

A verification apparatus for verifying a negative image on film and a positive image on photographic paper against each other. Respective transmission densities of a plurality of picture elements of the film image and respective reflection densities of a plurality of picture elements of the photographic paper image are detected, and comparison is made between the transmission density of each of the picture elements of the film image and the reflection density of the corresponding picture element of the photographic paper image, thereby making judgement as to whether or not the photographic paper image and the film image correspond to each other.

19 Claims, 13 Drawing Figures

FIG. 2
(A)
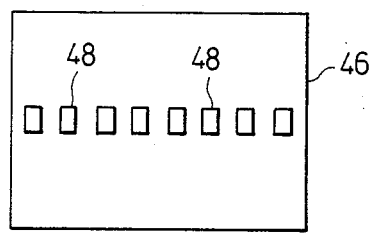
(B)
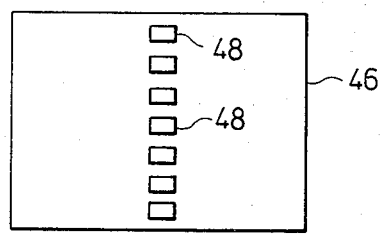
(C)
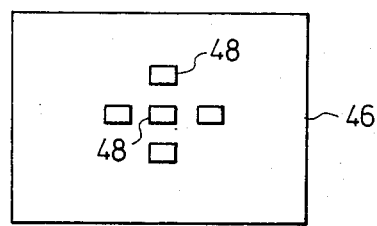

FIG. 6
(A)
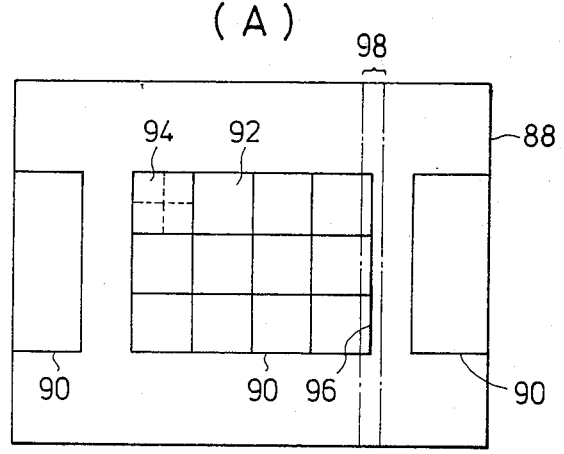
(B)
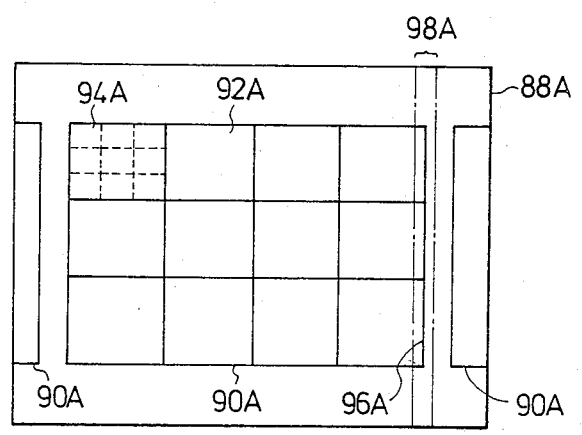

VERIFICATION APPARATUS

BACKGROUND OF THE INVENTION

1. Field of the Invention

The present invention relates to a verification apparatus for automatically effecting verification as to whether or not an image on a print and an image on a developed film correspond to each other.

2. Description of the Related Art

An image recorded on film is generally printed on photographic paper by an enlarger or a printer to form a photoprint which allows observation by reflected light. One type of apparatus for forming such photoprint has recently been proposed wherein negative film wound in the shape of a roll and photographic paper also wound in the shape of a roll are employed, and light is applied to the photographic paper through the negative film by means of a projector. In this type of apparatus, the negative film is cut into predetermined regular lengths, and the strips of negative film thus cut are put into bags, whereas the photographic paper is cut for each image. It is therefore necessary to verify whether or not the images on the negative film and the photoprints correspond to each other.

This kind of verification has heretofore been conducted visually by an operator, which involves the problem that, as the operating time becomes longer, the rate of occurrence of verification errors increases. In addition, the strips of negative film which have automatically put into bags need to be pulled out of each bag for verification, and after verification, they must be put back into the bag, and this leads to a troublesome operation.

SUMMARY OF THE INVENTION

In view of the above-described circumstances, it is a primary object of the present invention to provide a verification apparatus which is capable of correctly and automatically making judgement as to whether or not an image on photographic paper and an image on film print correspond to each other.

To this end, the present invention provides a verification apparatus comprising: first density detecting means for detecting respective densities of a plurality of picture element of an image on photographic paper; second density detecting means for detecting respective densities of a plurality of picture elements of an image on film; and image correspondence judging means for making judgement as to whether or not the photographic paper image and the film image correspond to each other by making comparison between the density of each of the plurality of picture elements of the photographic paper image and the density of the corresponding picture element of the film image.

To detect respective densities of the above-described plurality of picture elements, a plurality of sensors may be employed so as to respectively detect densities of the plurality of picture elements. Alternatively, the arrangement may be such that the density of the whole of the picture elements is first detected and then, this density is divided into a plurality of portions, thereby detecting respective densities of a pluraliry of picture elements. To make comparison between the densities of the corresponding picture elements, since film images and photographic paper images are generally negative and positive, respectively, the comparison is made after inverting the density of each picture element of either the film image or photographic paper image. Alternatively, the densities of the corresponding picture elements of the photographic paper image and the film image are compared with each other by calculating a characteristic quantity of density of each of the picture elements (e.g., density itself, contrast or color) and making comparison between the calculated characteristic quantities of the corresponding picture elements.

According to the present invention, comparison is made between the density of each of a plurality of picture elements of an image on photographic paper and the density of the corresponding picture element of an image on film, and when the densities of all the plurality of corresponding picture elements are judged to be in correspondence to each other, the photographic paper image and the film image are judged to be in correspondence to each other.

As described above, according to the present invention, judgement is made as to whether or not an image on photographic paper and an image on film correspond to each other by making comparison between the density of each of the picture elements of the photographic paper image and the density of the corresponding picture element of the film image. It is therefore possible to accurately and automatically make judgement as to whether or not a photographic paper image and a film image correspond to each other.

BRIEF DESCRIPTION OF THE DRAWINGS

FIGS. 2(A) to 2(C) exemplarily show picture elements to be measured of a frame image;

FIGS. 4 to 7 show in combination a second embodiment of the present invention, in which:

FIG. 4 shows the arrangement of an essential part of a printer employed in the second embodiment;

FIG. 5 shows the arrangement of an essential part of a cutter employed in the second embodiment;

FIG. 6(A) is a schematic view showing the relationship between the light-receiving area of an image sensor employed in the second embodiment and a frame image of film;

FIG. 6(B) is a schematic view showing the relationship between the light-receiving area of another image sensor employed in the second embodiment and a frame image of photographic paper.

DESCRIPTION OF THE PREFERRED EMBODIMENTS

A first embodiment of the present invention will be described hereinunder with specific reference to FIGS. 1 to 3.

Figure 1:
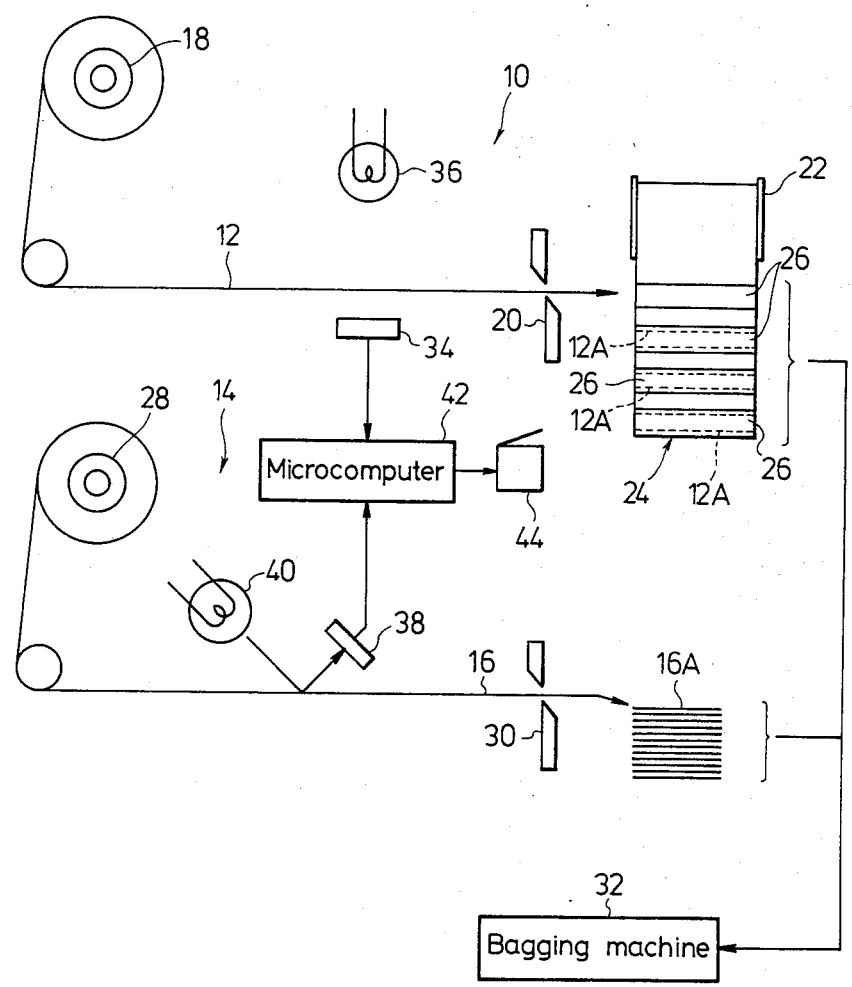
FIG. 1 schematically shows the arrangement of an essential part of a first embodiment of the verification apparatus according to the present invention.

As shown in FIG. 1, a verification apparatus in accordance with the first embodiment is arranged such that a developed negative film 12 is cut into predetermined regular lengths by a cutter 10, whereas a roll of photographic paper 16 which has been printed by a printer is cut for each frame by a cutter 14.

The negative film 12, which is wound on a reel 18, is cut by blades 20 of the cutter 10 in the course of transportation, and each strip of film 12 thus cut is loaded, by a film loader (not shown), into one of the accommodating portion 26 of a negative film accommodating bag 24 wound on a reel 22. In FIG. 1, each strip of negative film 12 cut by the blades 20 and accommodated in the accommodating portion 26 is denoted by the reference numeral 12A.

The photographic paper 16 wound on a reel 28 is cut by blades 30 of the cutter 14 in the course of transportation, and strips of the paper 16 thus cut, i.e., prints, are stacked up by a sorter (not shown). In FIG. 1, stacked prints are denoted by the reference numeral 16A.

The negative film strips 12A loaded in the negative film accommodating bag 14 and the stacked prints 16A are put into a bag for each individual customer's order by a bagging machine 32.

In the cutter 10, a light-receiving device 34 and a light source 36 are disposed so as to oppose each other across the negative film 12 being transported to the cutter blades 20, whereby the light transmission density of the negative film 12 is measured by the combination of the light-receiving device 34 and the light source 36. In the cutter 14, a light-receiving device 38 and a light source 40 are disposed so as to face the image-carrying side of the photographic paper 16 being transported to the cutter blades 30, whereby the reflection density of the photographic paper 16 is measured by the combination of the light-receiving device 38 and the light source 40.

Signal respectively output from the light-receiving devices 34 and 38 are input to a microcomputer 42 which makes judgement as to whether or not each of the images on the negative film 12 and a presumably corresponding image on the photographic paper 16 actually correspond to each other and notifies, when they do not correspond to each other, an operator of this fact by sounding a buzzer 44.

The light-receiving devices 34 and 38 are disposed such as to correspond to each other so that they measure the respective densities of picture elements 48 of a frame image 46 as shown in FIG. 2. Picture elements 48 in any portion of a frame 46 may be measured, provided that the picture elements of measurement on the negative film 12 and those on the photographic paper 16 correspond to each other. For example, picture elements 48 in a portion of a frame 46 such as that shown in FIG. 2(A), 2(B) or 2(C) may be measured. In the case of FIG. 2(A), picture elements 48 to be measured are in a row in the longitudinal directions of the negative film 12 and the photographic paper 16, and since the film 12 and the paper 16 are transported in their longitudinal directions, all the picture elements 48 can be measured by providing only one light-receiving device 34 for the negative film 12 and also only one light-receiving device 38 for the photographic paper 16. In the case of FIG. 2(B), picture elements 48 to be measured are in a row in a direction perpendicular to the longitudinal axes of the negative film 12 and the photographic paper 16 (in a direction perpendicular to a direction in which the film 12 and the paper 16 are transported), and it is therefore possible to measure the picture element densities over a relatively wide range. In this case, however, it is necessary to provide a number of light-receiving devices which is equal to the number of picture elements 48 of measurement. In the case of FIG. 2(C), the picture element densities in the center of the frame image 46 are measured. Since the point of an object, which is usually in focus, is generally recorded in the center of a picture, it is possible to distinctly calculate a characteristic quantity even by measuring the densities of a relatively small number of picture elements. In this case also, it is necessary to provide a number of light-receiving devices which is equal to that of picture elements of measurement.

The following is a description of the operation of the first embodiment arranged as detailed above.

Figure 3:
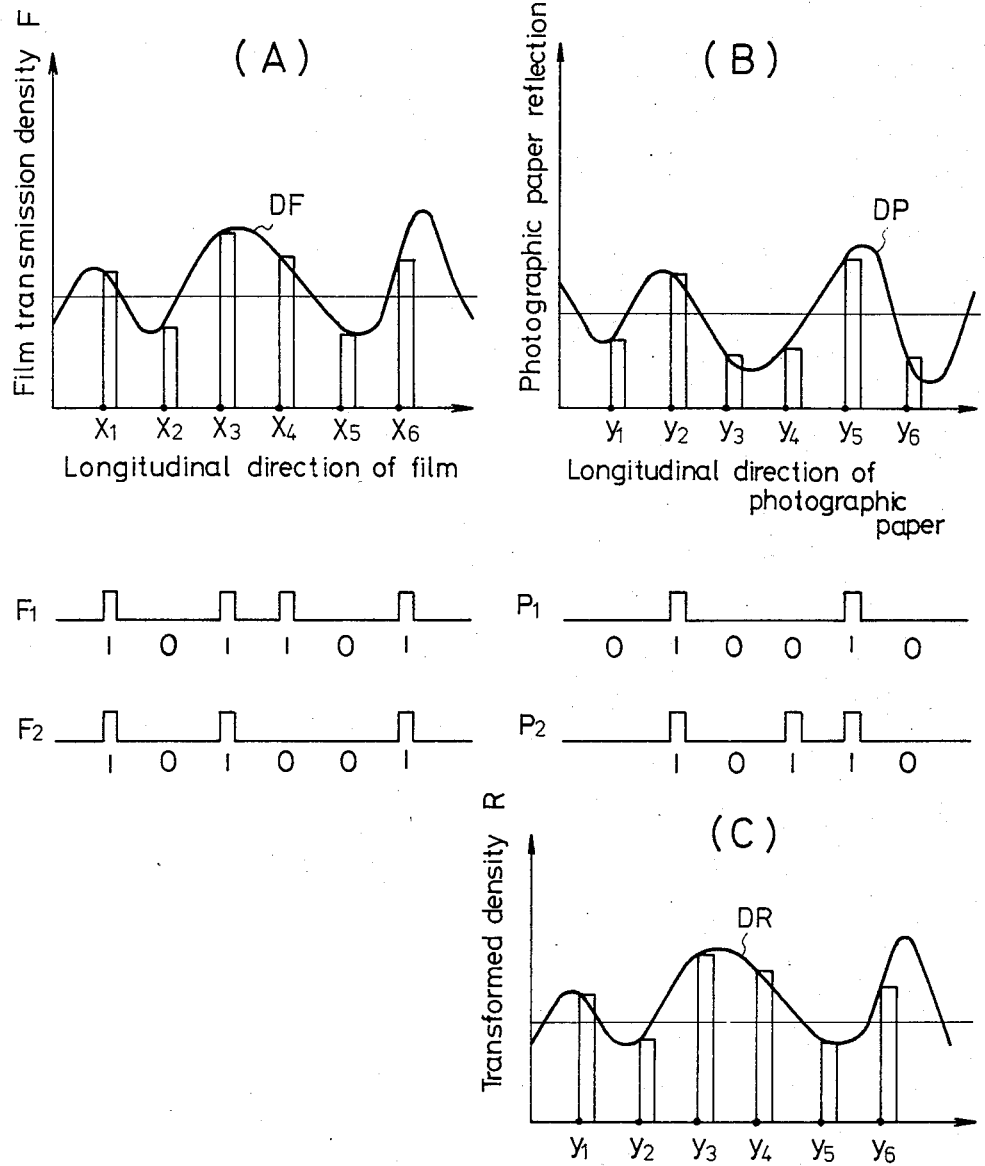
FIGS. 3(A) to 3(C) are graphs respectively showing methods of making judgement as to whether or not an image on photographic paper and an image on film correspond to each other.

FIG. 3 shows the density of each of the picture elements corresponding to those shown in FIG. 2(A). FIG. 3(A) shows a density curve DF of an image on the negative film 12 in the longitudinal direction thereof, and FIG. 3(B) shows a density curve DP of an image on the photographic paper 16 in the longitudinal direction thereof. The graphs shown in FIGS. 3(A) and 3(B) respectively represent the two kinds of picture element density in relation to the same image, and the peaks and valleys of the curve DF and those of the curve DP inversely correspond to each other. The symbols $x_1$ to $x_6$ in FIG. 3(A) respectively represent sampling points by the light-receiving device 34 which respectively correspond to sampling points $y_1$ to $y_6$ (see FIG. 3(B)) by the light-receiving device 38. There may be various methods of making judgement as to whether or not the respective images on the negative film 12 and the photographic paper 16 correspond to each other, depending on the characteristic quantity employed. Examples of such methods will be explained below.

(Method 1)

To compare the curves DF and DP with each other, the density I of either one of the two curves (either the film transmission density F or the photographic paper reflection density P) is converted to a value J by the following transformation formula:

$$j = \alpha - \beta I \ldots \quad (1)$$

where, $\alpha$ and $\beta$ are constants. In other words, since the peaks and valleys of the curve DF inversely correspond to those of the curve DP, the density I of either of the two is inverted so as to correspond to the density of the other.

The curve DR shown in FIG. 3(C) is obtained by transforming the curve DP (the photographic paper reflection density P) using the formula (1). The curver DR is approximately coincident with the curve DF. In this example, two images are judged to be in correspondence to each other when the following condition holds with respect to all the values of i:

$$|F(x_i) - R(y_i)| < \delta$$

where $F(x_i)$ represents the film transmission density at the samplying point $x_i$, $R(y_i)$ the transformed density $R(y_i)$ of the photographic paper reflection density $P(y_i)$ at the sampling point $y_i$, and $\delta$ a constant value.

(Method 2)

A mean value $\bar{F}$ of $F(x_i)$ is obtained, and when $F(x_i) - \bar{F} > \delta$, the film transmission density F is represented by 1, whereas, when $F(x_i) - \bar{F} < -\delta$, the density F is represented by 0 (see FIG. 3F$_1$). Similarly, a mean value $\bar{P}$ of $P(y_i)$ is obtained, and when $P(y_i) - \bar{P} > \delta$, the photographic paper reflection density P is represented by 1, whereas, when $P(y_i) - \bar{P} < -\delta$, the density P is represented by 0 (see FIG. 3P$_1$). Such trains of numbers 0 and 1 are added together at the sampling points, and when the sum of the numbers at each sampling point is 1, two images are judged to be in correspondence to each other. It should be noted that when the condition is $|F(x_i)-\overline{F}| \leqq \delta$ or $|P(y_i)-\overline{P}| \leqq \delta$, no data is set in the above number trains, and any measured density which falls in such range is not taken as the object of comparison. This is to avoid a possible misjudgement due to errors in measurement.

(Method 3)

When $F(x_{i+1})-F(x_i)>\gamma$, the density F is represented by 1, whereas, when $F(x_{i+1})-F(x_i)<-\gamma$, the density F is represented by 0 (see FIG. 3F$_2$). Similarly, when $P(y_{i+1})-P(y_i)>\gamma$, the density P is represented by 1, whereas, when $P(y_{i+1})-P(y_i)<-\gamma$, the density P is represented by 0 (see FIG. 3P$_2$). In other words, when the density increases, it is represented by 1, whereas, when the density decreases, it is represented by 0. Such trains of number 0 and 1 are added together at the sampling points, and when the sum of the numbers at each sampling point is 1, two images are judged to be in correspondence to each other. Similarly to Method 2, when densities meet the conditions of $|P(y_{i+1})-P(y_i)| \leqq \gamma$ and $|F(x_{i+1})-F(x_i)| \leqq \gamma$, they are not taken as the objects of comparison.

(Other Methods)

Further, judgement may be made as to whether or not two images correspond to each other by making comparison using the difference between maximum and minimum values of each of the densities F and P, sampling points $x_i$ and $y_i$ which show maximum and minimum values of the densities F and P, density frequency distribution, or colors of picture elements.

Corresponding sampling points $x_i$ and $y_i$ can be obtained by detecting a frame edge of a frame image for the negative film 12 and the photographic paper 16 and using the detected frame edge as a reference position. Such frame edge can be detected by discriminating a portion of a frame at which the density suddenly changes.

A second embodiment of the present invention will be described below.

Figure 4:
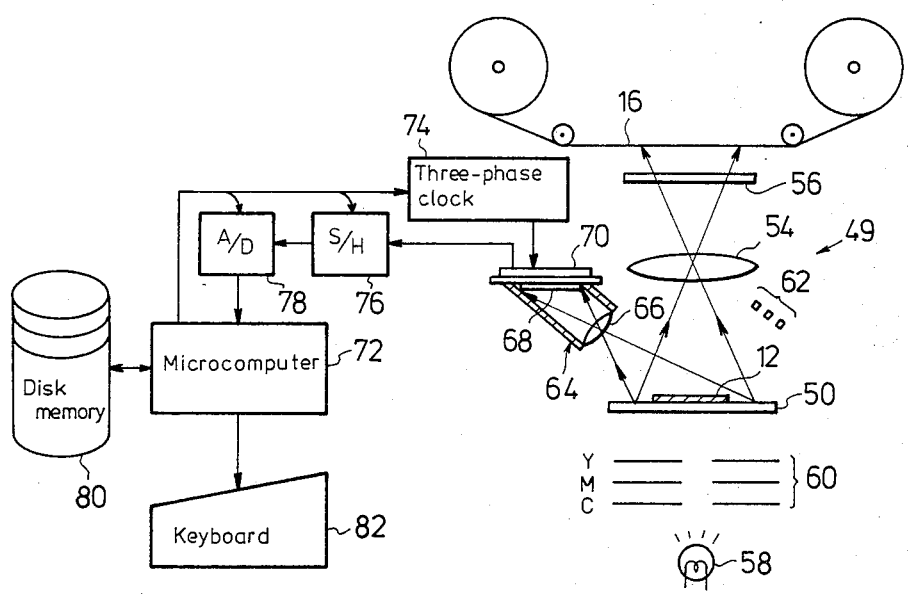

Referring to FIG. 4, an area image sensor 64, which is a photosensor, is disposed in a printer 49. In order that the negative film 12 and the photographic paper 16 are independently cut by the respective cutters without synchronizing the cutters with each other, characteristic quantities of images on the negative film 12 are temporarily stored in a disk memory 80, and a disk in this disk memory 80 is loaded in a disk memory 80A provided in the cutter for cutting the photographic paper 16 to make comparison between the characteristic quantity of each of the images on the photographic paper 16 and the characteristic quanity of the presumably corresponding image on the negative film 12 stored in the disk memory 80.

As shown in FIG. 4, an enlarging lens 54 and a shutter 56 which constitute in combination the printer 49 are disposed between the negative film 12 and the photographic paper 16. When the shutter 56 is opened, an image on the negative film 12 is formed on the photographic paper 16. A light source 58 is disposed below the negative film 12 so that the light from the light source 58 passes through the negative film 12. Color compensating filters 60 are disposed between a film mount 50 and the light source 58 so that the light from the light source 58 is appropriately adjusted to balance the colors of the image on the negative film 12. Light receivers 62 are disposed around the enlarging lens 54 so as to face the surface of the negative film 12. The light receivers 62 are adapted to detect film transmission densities for cyan (C), magenta (M) and yellow (Y), respectively. Further disposed near the enlarging lens 54 is the area image sensor 64 so as to face the surface of the negative film 12. The image on the negative film 12 is formed on a photoelectric transducer 68 through a lens 66 of the image sensor 64. Accordingly, unlike the light receivers 62, the area image sensor 64 can detect the density of each of the picture elements of the image on the negative film 12. Signal charges which are obtained through photoelectric conversion effected by the photoelectric transducer 68 are transferred to a charge transfer register 70. These signal charges are successively transferred to a sample-and-hold circuit 76 by three-phase clock pulses generated from a three-phase clock circuit 74. The signals sampled and held by the circuit 76 are converted to digital signals by an A/D converter 78 and supplied to a microcomputer 72. The operation timing of the three-phase clock circuit 74, the sample-and-hold circuit 76 and the A/D converter 78 is controlled by a control signal output from the microcomputer 72. The microcomputer 72 is supplied with key signals from a keyboard 82 so that it is possible to input a film identification number and a number of prints to be made. The microcomputer 72 calculates characteristic quantities of a film image from the picture element data delivered from the area image sensor 64 and stores the calculated characteristic quantities, together with the film identification number and the number of required prints, into the disk memory 80.

Figure 5:
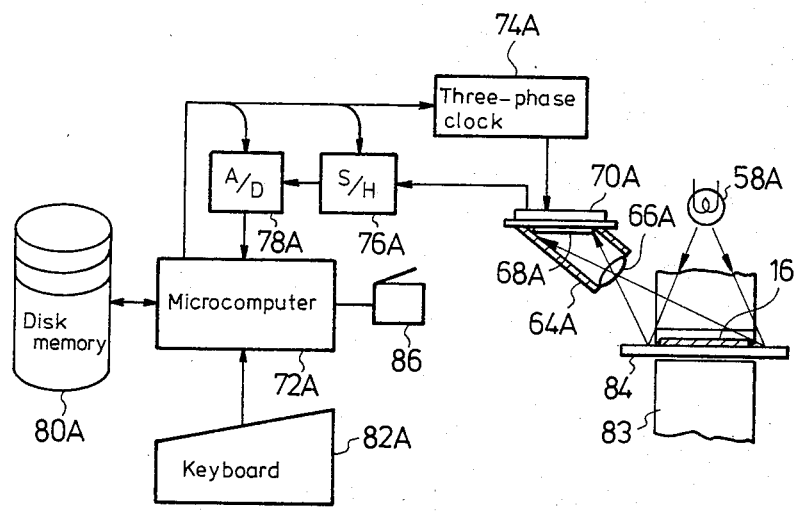

Referring next to FIG. 5, the apparatus for calculating characteristic quantities of each of the images on the photographic paper 16 and for making comparison between the characteristic quantities of each image on the negative film 12 and those of the presumably corresponding image on the photographic paper 16 is provided on the cutter for cutting the photographic paper 16. The photographic paper 16 mounted on a photographic paper mount 84 is transported, frame by frame, toward blades 83 of the cutter. A light source 58A is disposed above the photographic paper 16, and an area image sensor 64A is disposed above the photographic paper 16 so as to obliquely face the surface of the paper 16, whereby the reflection density of each image on the photographic paper 16 can be detected for each picture element. The arrangement of the other part is the same as the arrangement shown in FIG. 4 except for that an alarming buzzer 86 is connected to a microcomputer 72A in the arrangement shown in FIG. 5. Therefore, the symbol A is suffixed to the reference numerals of members or portions shown in FIG. 5 which correspond to those shown in FIG. 4, and description thereof is omitted. It should be noted that a disk used in the disk memory 80 shown in FIG. 4 is loaded in the disk memory 80A. In addition, a film identification number which corresponds to each of the frame of the photographic paper 16 is supplied to the microcomputer 72A from the keyboard 82A. The microcomputer 72A calculates characteristic quantities of each image on the photographic paper 16 from the picture element data concerning the reflection density of the photographic paper 16 deteced by the area image sensor 64A, and compares the calculated characteristic quantities with the characteristic quantities of the presumably corresponding image on the negative film 12 read out from the disk memory 80A, thereby making judgement as to whether or not both the images actually correspond to each other.

Figure 7A:
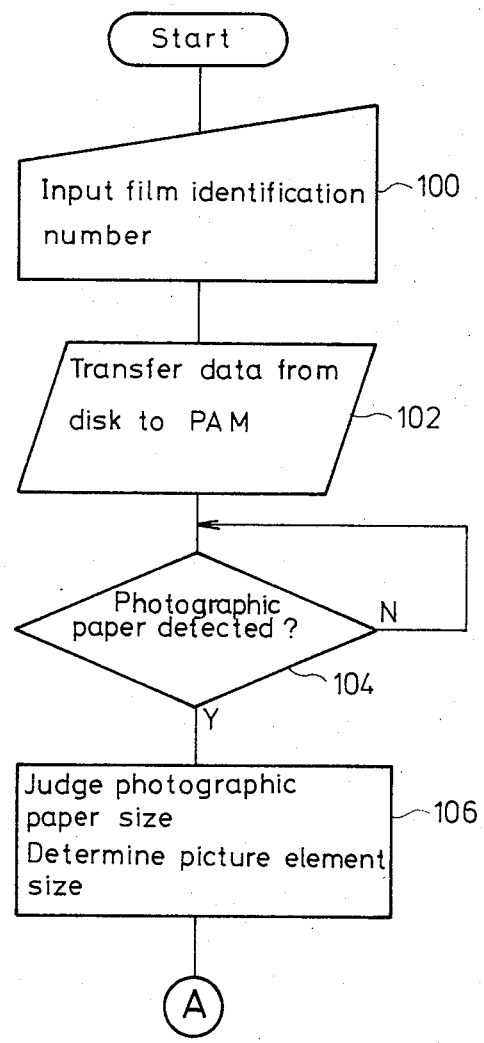
FIG. 7A and 7B are a control flowchart for a microcomputer employed in the second embodiment.
Figure 7B:
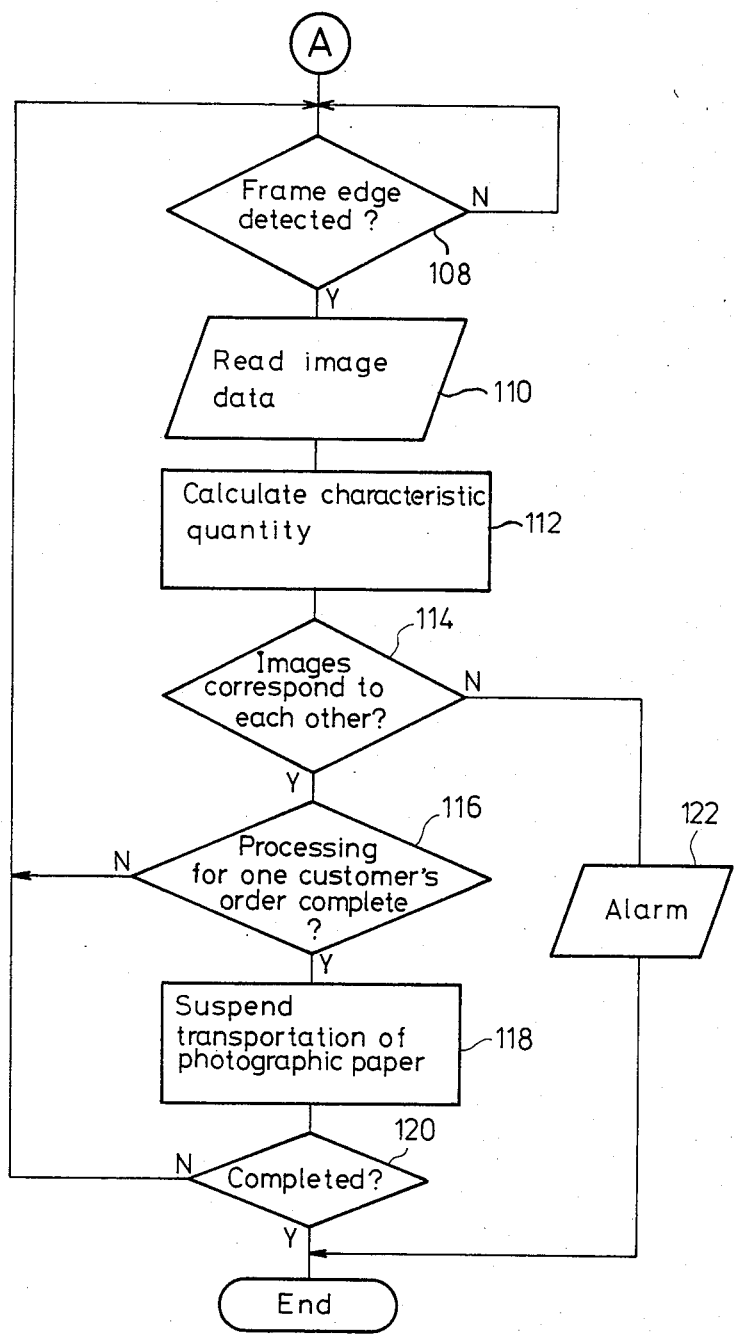

The following is a description of the operation of the second embodiment arranged as detailed above, with reference to FIGS. 6 and 7.

FIG. 6(A) schematically shows the relationship between the light-receiving area 88 of the photoelectric transducer 68 and picture elements on the negative film 12. The size of each of the frame images 90 is so set that it is contained within the light-receiving area 88. The frame image 90 consists of 4×3 picture elements 92 which are divided in a software manner. The number of divisions of the frame image 90 is determined by predetermining a number of divisions in the lengthwise direction and a number of divisions in the widthwise or lateral direction. More specifically, numbers of divisions are stored in respective ROMs of the microcomputers 72 and 72A in advance. The frame image 90 is divided in such a manner that the lengthwise and widthwise dimensions of each frame image 90 are calculated from the pattern of the frame image 90 detected by the image sensor 64, and the frame image 90 is then divided into the predetermined number of picture elements 92. The lengthwise and widthwise directions are respectively defined by a relatively small dimension and a relatively large dimension. Accordingly, even a half-size image frame can correctly be divided. For simplification of description, it is assumed that each set of light-receiving picture elements 94 for one picture element 92 is constituted by, for example, four light-receiving picture elements 94 in the form of hardware which respectively correspond to four light-receiving elements. Densities respectively measured by the four light-receiving picture elements 94 are averaged to obtain a picture element density of the corresponding picture element 92. This picture element density depends on the relative positional relationship between the light source 58 and the area image sensor 64 even for the same picture element. However, any possible error can be compensated for in the following manner. When the density at a line are 98 shown by the one-dot chain line in FIG. 6(A) suddenly changes as the negative film 12 is moved, a frame edge 96 of the frame image 90 is acknowledged. A density which is detected by the photoelectric transducer 68 at this time is read and stored so as to be used as a density of each of the picture elements 92. Since the line area 98 is located at a fixed position, a correction quantity for each picture element 92 is thereby set. It should be noted that, by detecting a frame edge 96 from the line area 98, it is possible to accurately control the frame-by-frame feed of the negative film 12 without a need to provide notches or the like in the film 12.

Characteristic quantities of the frame image 90 are calculated in a manner similar to those in the case of the first embodiment. For example, a density of each image is calculated in a manner similar to that in the case of the first embodiment. For example a density of each picture element 92 which is less or more than a mean value is represented by 1 or 0 to prepare 12-bit data whereby characteristic quantities of the frame image 90 are obtained.

FIG. 6(B) schematically shows the relationship between the light-receiving area 88A of the photoelectric transducer 68A and picture elements on the photographic paper 16. FIG. 6(B) corrresponds to FIG. 6(A) and, therefore, portions in FIG. 6(B) which correspond to those shown in FIG. 6(A) are denoted by the same reference numerals having A suffixed thereto. The way in which the picture elements are divided and other arrangements are similar to those in the case described above. Thus, picture elements 92 and 92A have similar figures and possess one to one correspondence to each other. Accordingly, the number of picture elements of the frame image 90A is 4×3=12. However, unlike the picture elements 92, each of the picture elements 92A corresponds to nine light-receiving picture elements 94A.

The control routine of the microcomputer 72A will be explained below with reference to the control flowchart shown in FIG. 7.

A film identification number which corresponds to the photographic paper 16 is input from the keyboard 82A (Step 100). Then, data concerning characteristic quantities of images on the negative film 12 corresponding to the input film identification number is transferred en bloc to the RAM in the microcomputer 72A (Step 102). Then, arrival of the photographic paper 16 being transported is awaited. More specifically, detection of the photographic paper 16 by the area image sensor 64A is awaited (Step 104). When the photographic paper 16 reaches a position below the light source 58A, the area image sensor 64A detects the dimension of the paper 16 in a direction perpendicular to the longitudinal direction of the paper 16 to judge the photographic paper size. In addition, the size of the picture elements 92A corresponding to the picture elements 92 is determined from the photographic paper size (Step 106). Thus, it is possible to make the characteristic quantities of the frame image 90 and those of the frame image 90A have one to one correspondence to each other. Then, as the photographic paper 16 is moved, a sudden change in density at the line area 98A is detected to acknowledge a frame edge (Step 108). When the frame edge 96A is detected, picture element data at this time is read from the area image sensor 64A (Step 110). Then, characteristic quantities of the frame image 90A are calculated (Step 112). Then, comparison is made between the characteristic quantities of the frame image 90 stored in the RAM in Step 102 and the calculated characteristic quantities of the frame image 90A (Step 114). In this comparison, correspondence between the frame images 90 and 90A is verified taking account of also the number of required prints of the same image. When both the characteristic quantities are judged to be in correspondence to each other, judgement is made as to whether or not processing of prints for one customer's order has been completed from the data stored in the RAM in Step 102 (Step 116). This judgement may be made by detecting a mark, e.g., a pinhole, which is provided in the photographic paper 16 to indicate the boundary between two adjacent series of prints for two different customer's orders. If the processing of prints for one customers order has not yet been completed, the control process returns to Step 108, and the above-described process is repeated. When the processing of prints for one customer's order has already been completed, the transportation of the photographic paper 16 is suspended, and an operator bags the photographic paper 16. When the operator depresses the restart key (not shown) of the keyboard 82A to input a restart signal (Step 118), judgement is made as to whether or not cutting of the photographic paper 16 for all the films represented by the film identification numbers input in Step 100 has been completed (Step 120). If the cutting has not yet been completed, the control process returns to Step 108, and processing of prints for a subsequent customer's order is resumed.

When the characteristic quantities of the two images do not correspond to each other in Step 114, and the frame images 90 and 90A are consequently judged to be out of correspondence with each other, the buzzer 86 is sounded (Step 122). Accordingly, it is only necessary for the operator to take appropriate measures so as to remove a particular cause only when both the images are judged to be out of correspondence with each other.

It should be noted that line image sensors may be employed in place of the area image sensors 64 and 64A.

In the first embodiment also, characteristic quantities may be stored in memories so that it is possible to make judgement as to whether or not an image on photographic paper and a presumably corresponding image on negative film actually correspond to each other without a need to synchronize the cutters for the photographic paper and the negative film.

What is claimed is:

1. A verification apparatus for verifying an image on photographic paper and an image on film against each other, comprising:
   first density detecting means for detecting respective densities of a plurality of picture elements of the image on photographic paper;
   second density detecting means for detecting respective densities of a plurality of picture elements of the image on film; and
   image correspondence judging means for making judgement as to whether or not said photographic paper image and said film image correspond to each other by making comparison between the density of each of the plurality of picture elements of said photographic paper image and the density of the corresponding picture element of said film image.

2. A verification apparatus according to claim 1, wherein said image correspondence judging means inverts the respective densities of the plurality of picture elements of said photographic paper image, and makes comparison between the inverted density of each of the picture elements of said photographic paper image and the density of the corresponding picture element of said film image, thereby making judgement as to whether or not said photographic paper image and said film image correspond to each other.

3. A verification apparatus according to claim 2, wherein said image correspondence judging means obtains differences between the inverted densities of the picture elements of said photographic image and the densities of the corresponding picture elements of said film image, and judges said photographic paper image and said film image to be in correpondence to each other when each of said differences is less than a predetermined value.

4. A verification apparatus according to claim 1, wherein said image correspondence judging means inverts the respective densities of the plurality of picture elements of said film image, and makes comparison between the inverted density of each of the picture elements of said film image and the density of the corresponding picture element of said photographic paper image, thereby making judgement as to whether or not said photographic paper image and said film image correspond to each other.

5. A verification apparatus according to claim 4, wherein said image correspondence judging means obtains differences between the inverted densities of the picture elements of said film image and the densities of the corresponding picture elements of said photographic paper image, and judges said photographic paper image and said film image to be in correspondence to each other when each of said differences is less than a predetermined value.

6. A verification apparatus according to claim 1, wherein said first density detecting means detects the respective densities of a plurality of picture elements of said photographic paper image by detecting the light reflected from the photographic paper, and said second density detecting means detects the respective densities of a plurality of picture elements of said film image by detecting the light transmitted by the film.

7. A verification apparatus according to claim 1, wherein said first density detecting means is disposed in a cutter for cutting the photographic paper, while said second density detecting means is disposed in a cutter for cutting the film, and said image correspondence judging means makes judgement as to whether or not said photographic paper image and said film image correspond to each other while synchronizing said two cutters with each other.

8. A verification apparatus for verifying an image on photographic paper and an image on film against each other, comprising:
   first density detecting means for detecting respective densities of a plurality of picture elements of the image on photographic paper;
   first characteristic quantity calculating means for calculating a first characteristic quantity of the density of each of the picture elements of said photographic paper image on the basis of the output from said first density detecting means;
   second density detecting means for detecting respective densities of a plurality of picture elements of the image on film;
   second characteristic quantity calculating means for calculating a second characteristic quantity of the density of each of the picture elements of said film image on the basis of the output from said second density detecting means; and
   image correspondence judging means for making judgement as to whether or not said photographic paper image and said film image correspond to each other by making comparison between the first characteristic quantity of the density of each of the picture elements of said photographic paper image and the second characteristic quantity of the density of the corresponding picture element of said film image.

9. A verification apparatus according to claim 8, wherein said first characteristic quantity calculating means calculates a first characteristic quantity of each of the picture elements of said photographic paper image on the basis of a mean value of the densities of the plurality of picture elements of said photographic paper image and the density of each picture element of said photographic paper image, and said second characteristic quantity calculating means calculates a second characteristic quantity of each of the picture elements of said film image on the basis of a mean value of the densities of the plurality of picture elements of said film image and the density of each picture element of said film image.

10. A verification apparatus according to claim 9, wherein said first characteristic quantity calculating means defines either one of binary variables as a first characteristic quantity when the density of each picture element of said photographic paper image exceeds said mean value of the photographic paper image density, and defines the other of the binary variables as a first characteristic quantity when the densitiy of each picture element of said photographic paper image is less than said mean value of the photographic paper image density, while said second characteristic quantity calculating means defines either one of binary variables as a second characteristic quantity when the density of each picture element of said film image exceeds said means value of the film image density, and defines the other of the binary variables as a second characteristic quantity when the density of each picture element of said film image is less than said mean value of the film image density, and said image correspondence judging means makes comparison between the first characteristic quantity of the density of each picture element of said photographic paper image and the second characteristic quantity of the density of the corresponding picture element of said film image, and judges said photographic paper image and said film image to be in correspondence to each other when all the first and second characteristic quantities are not coincident with each other.

11. A verification apparatus according to claim 8, wherein said first characteristic quantity calculating means calculates a first characteristic quantity of each of the picture elements of said photographic paper image on the basis of the difference between the respective densities of picture elements of said photographic paper image which are adjacent to each other and said second characteristic quantity calculating means calculates a second characteristic quantity of each of the picture elements of said film image on the basis of the difference between the respective densities of picture elements of said film image which are adjacent to each other.

12. A verification apparatus according to claim 8, wherein said first density detecting means detects the respective densities of plurality of picture elements of said photographic paper image by detecting the light reflected from the photographic paper, and said second density detecting means detects the respective densities of a plurality of picture elements of said film image by detecting the light transmitted by the film.

13. A verification apparatus according to claim 6, wherein said first density detecting means is disposed in a cutter for cutting the photographic paper, while said second density detecting means is disposed in a printer for printing the film image on the photographic paper, and a memory for storing either said first or second characteristic quantity is provided, said image correspondence judging means making judgement as to whether or not said photographic paper image and said film image correspond to each other on the basis of the characteristic quantity stored in said memory without synchronizing said cutter and said printer with each other.

14. A verification apparatus for verifying an image on photographic paper and an image on film against each other, comprising:
a first image sensor for detecting the density of the image on photographic paper;
first dividing means for dividing the detected photographic paper image into a predetermined plurality of picture elements by judging the size of the photographic paper image on the basis of the output from said first image sensor and determining a size of picture elements which is proportional to the judged image size;
first characteristic quantity calculating means for calculating a first characteristic quantity of the density of each of the picture elements of said photographic paper image on the basis of the result of division by said first dividing means;
a second image sensor for detecting the density of the image on film;
second dividing means for dividing the detected film image into said predetermined plurality of picture elements by judging the size of the film image on the basis of the output from said second image sensor and determining a size of picture elements which is proportional to the judged image size;
second characteristic quantity calculating means for calculating a second characteristic quantity of the density of each of the picture elements of said film image on the basis of the result of division by said second dividing means; and
image correspondence judging means for making judgement as to whether or not said photographic paper image and said film image correspond to each other by making comparison between the first characteristic quantity of the density of each picture element of said photographic paper image and the second characteristic quantity of the density of the corresponding picture element of said film image.

15. A verification apparatus according to claim 14, wherein said first characteristic quantity calculating means calculates a first characteristic quantity of each of the picture elements of said photographic paper image on the basis of a mean value of density of said photographic paper image and the density of each picture element of said photographic paper image, and said second characteristic quantity calculating means calculates a second characteristic quantity of each of the picture elements of said film image on the basis of a mean value of density of said film image and the density of each picture element of said film image.

16. A verification apparatus according to claim 15, wherein said first characteristic quantity calculating means defines either one of binary variables as a first characteristic quantity when the density of each picture element of said photographic paper image exceeds said mean value of the photographic paper image density, and defines the other of the binary variables as a first characteristic quantity when the density of each picture element of said photographic paper image is less than said mean value of the photographic paper image density, while said second characteristic quantity calculating means defines either one of binary variables as a second characteristic quantity when the density of each picture element of said film image exceed said mean value of the film image density, and defines the other of the binary variables as a second characteristic quantity when the density of each picture element of said film image is less than said mean value of the film image density, and said image correspondence judging means makes comparison between the first characteristic quantity of the density of each picture element of said photographic paper image and the second characteristic quantity of the density of the corresponding picture element of said film image, and judges said photographic paper image and said film image to be in correspondence to each other when all the first and second characteristic quantities are not coincident with each other.

17. A verification apparatus according to claim 14, wherein said first characteristic quantity calculating means calculates a first characteristic quantity of each picture element of said photographic paper image on the basis of the difference between the respective densities of picture elements of said photographic paper image which are adjacent to each other, and said second characteristic quantity calculating means calculates a second characteristic quantity of each picture element of said film image on the basis of the difference between the respective densities of picture elements of said film image which are adjacent to each other.

18. A verification apparatus according to claim 14, wherein said first image sensor detects the density of said photographic paper image by detecting the light reflected from the photographic paper, and said second image sensor detects the density of said film image by detecting the light transmitted by the film.

19. A verification apparatus according to claim 14, wherein said first image sensor is disposed in a cutter for cutting the photographic paper, while said second image sensor is disposed in a printer for printing the film image on the photographic paper, and a memory for storing either said first or second characteristic quantity is provided, said image correspondence judging means making judgement as to whether or not said photographic paper image and said film image correspond to each other on the basis of the characteristic quantity stored in said memory without synchronizing said cutter and said printer with each other.

* * * * *